(12) United States Patent
Leon

(10) Patent No.: US 6,889,859 B1
(45) Date of Patent: May 10, 2005

(54) LID FOR BEVERAGE CONTAINERS

(76) Inventor: Richard Joseph Leon, 900 W. Bitner Rd., Apt 0-35, Park City, UT (US) 84098

(*) Notice: Subject to any disclaimer, the term of this patent is extended or adjusted under 35 U.S.C. 154(b) by 0 days.

(21) Appl. No.: 10/348,412

(22) Filed: Jan. 21, 2003

Related U.S. Application Data
(60) Provisional application No. 60/349,447, filed on Jan. 18, 2002.

(51) Int. Cl.[7] .......................... A47G 19/22; A47G 1/40; A47G 25/00; A47G 51/18
(52) U.S. Cl. .................... 220/254.3; 220/703; 220/709; 220/719
(58) Field of Search .............................. 220/254.3, 254, 220/709, 712, 711, 713, 714, 719, 731, 377, 703

(56) References Cited

U.S. PATENT DOCUMENTS

| | | | | |
|---|---|---|---|---|
| 1,184,549 A | * | 5/1916 | McClung | 220/525 |
| 1,646,623 A | * | 10/1927 | McConnell | 220/254.3 |
| 3,417,897 A | * | 12/1968 | Johnson | 220/254.3 |
| 4,925,040 A | * | 5/1990 | Wang | 215/388 |
| 5,590,542 A | * | 1/1997 | Wang | 62/457.3 |
| 5,645,191 A | * | 7/1997 | Neville | 220/717 |
| 5,688,544 A | * | 11/1997 | Bolton et al. | 426/118 |
| 5,988,424 A | * | 11/1999 | Kovens | 220/254.3 |
| 6,079,586 A | * | 6/2000 | Hanneman | 220/526 |
| 6,196,412 B1 | * | 3/2001 | Cattell | 220/524 |
| 6,575,323 B1 | * | 6/2003 | Martin et al. | 220/254.3 |
| 6,578,726 B1 | * | 6/2003 | Schaefer | 220/253 |
| 2001/0027958 A1 | * | 10/2001 | Short et al. | |
| 2003/0141268 A1 | * | 7/2003 | Kern et al. | |

* cited by examiner

*Primary Examiner*—Derris H. Banks
*Assistant Examiner*—Faye Francis
(74) *Attorney, Agent, or Firm*—Alberto A. Leön, Esquire; Bauman, Dow & León, P.C.

(57) ABSTRACT

The invention disclosed herein generally concerns a lid for disposable or reusable beverage containers which facilitates access to the contents for addition of condiment and which enhances the users sensory perception of the state of such contents, without removal of the lid. The lid of the invention combines various sensory elements to simultaneously enhance the user's sensory responses of taste, smell, touch and sight during drinking with the beverage cup lid in place. The sensory elements comprise openings, transparent materials, shape and media, through which liquid and vapor can pass, and through which heat can, conduct or convect. In addition to the elements already described, the beverage cup lid of the invention comprises a physical element that allows the addition and stirring of condiments while the lid is fully installed on the cup. The invention disclosed herein integrates multiple elements of a press and lock on a beverage cup lid. The shape of the lid of the invention provides a thin rim simulating the thickness of a cup without a lid or a non-disposable ceramic or glass mug or cup. The lid disclosed herein provides a well deep enough to avoid contact between the nose and the lid in the drinking position, thereby allowing the user's head to remain more upright while drinking.

5 Claims, 4 Drawing Sheets

LID SHOW ENLARGED
FOR CLARITY

LID FOR BEVERAGE CONTAINERS

Applicant hereby claims the benefit under 35 U.S.C. 119(e) of provisional patent application Ser. No. 60/349,447 filed on Jan. 18, 2002.

BACKGROUND OF THE INVENTION

1. Fields of the Invention

Beverage container lids, hot beverage container lid, container lid spout, temperature sensing devices, smell, sight and taste enhancing media, container rims, moveable hatches.

2. Description of the Background Art

Disposable beverage lids and cups have been around for a very long time. The first widely used disposable cup was made of paper. The weight and thickness of the material varied with the type and temperature of the beverage to be contained in the cup. Later on, and due to the popularity and high volume output of the fast-food industry, the need for hot-beverage cups with lids became evident. The inception of drive-up window service usually associated with the fast-food industry made the safe containment of hot beverages an ever-pressing requirement.

A more recent phenomenon, causing a different demand for lids and cups, is the worldwide proliferation of the gourmet coffee café. These cafes serve exotic varieties of rich, hot coffee at an approximate cost of about $13.00 per gallon—nearly nine times the cost of premium gasoline. The demand for hot coffee served by these gourmet cafes has been very healthy and continues to be so in a growing market. However, there has not been much, if any, significant improvement in the container, i.e., the lid and cup, from the standpoint of the consumer's ability to manipulate and handle the container, and of the consumer's enhancement of pleasure derived from the consumption.

The predominant gourmet hot coffee cup is a paper cup sufficiently resistant to adequately contain coffee. The cup maintains its shape and structural integrity more effectively with a lid firmly placed and held on the top of the cup. The server usually places the lid on the cup after the coffee is poured into the cup. The lid and cup combination is a container that is stronger than the individual strengths of the separated components. The newest paper cups, with a plastic lid press-fitted in place creates an adequately strong container. The cup wall without the lid tends to deform under the grasp of a human hand.

The consumer then takes the hot cup of coffee to a condiment counter where the lid is removed to facilitate the addition of condiments, usually cream and/or sugar. The lid is usually set on the condiment counter while the consumer uses both hands to add condiments and stir them into the coffee. The consumer then generally replaces the lid and drinks the coffee. Some consumers throw the lid away in order to enjoy the aroma, taste, color, motion and temperature of the coffee, and to remove the cumbersome lid.

The existing lids have a small drinking hole on the perimeter of the lid allowing the consumer to drink and taste the coffee. The size and orientation of the drinking hole causes the lid drinking rim thickness, relative to the rim diameter, to be wider than what consumers are accustomed to when drinking from cups, either disposable without the lid or permanent, or mugs. This rim width and curvature influences the mouth to conform to a shape significantly different from the more normal shape of the mouth when drinking from a common cup without a lid or from a mug. This effect on the mouth is compounded by the upper surface of the common lid contacting the tip of the nose almost immediately upon tipping the cup for drinking. This untimely contact between nose and lid forces the head back to allow pouring of the beverage. This is not the case when drinking from a normal cup without a lid or from a mug because the nose can pass through the top plane of the cup or mug opening in the absence of a cup lid.

Taste and to some degree touch are the only senses that existing coffee lids allow the consumer to experience and enjoy. Touch, to sense the temperature of the contents, is experienced through the manual feeling of the temperature through the cup walls, and by contact between the lips and the plastic surface of the lid. Taste, by itself, without the compounded affect of multiple sensory responses, lowers the single sense affect. The limited touch sensing of the hot beverage temperature misrepresents the true temperature of the hot beverage until it pours out through the lid onto the tongue. The insulating effect of the plastic wall of the lid, and the shape and orientation of the spout in the commonly used lids, deprives the consumer of optimal taste and touch sensing.

Commonly used lids pour the hot beverage further back into the mouth and onto the tongue too quickly, thereby depriving the drinker of timely anticipation of taste and temperature by the maximum number of taste buds and nerve endings located from the very front to the back of the mouth. When multiple senses are simultaneously stimulated, the sensory response of each sense is greater than the sense being stimulated alone. When physical interruptions and obstructions to a normal sensory experience exist, so do distractions from the normal enjoyment of the experience. Its seems wasteful to drink a cup of expensive coffee, carefully selected, roasted, brewed, rich, hot and aromatic, covered with an inefficient lid which makes the experience clumsy and not very enjoyable.

Existing coffee lids are opaque and, except for the spout and a very tiny air vent hole, are vapor and liquid sealed. The old saying—I wish coffee tastes as good as it smells—begs the question—why should such a simple plastic lid deprive the consumer of the very important sense of smell which would enhance the enjoyment of a good cup of coffee? The same question applies to the senses of sight and touch, thus offering a potentially simple solution to several simple problems.

There are two other problems with state of the art lids that are unrelated to the sensory issues. Removal of the lid to add and stir in condiments, while solving one problem, causes another in that the coffee cup walls become weaker and tend to flatten in the grasp of a hand. A cup without a lid allows the contents—in this case, hot coffee—to cool faster, which is undesirable. A cup without a lid is potentially unsafe in the pedestrian and vehicular travel modes. The desire to not replace the lid usually overrides the physical practicality and safety aspects of replacing the lid unless the consumer is traveling while drinking in which case sensory response is sacrificed for safe and effective containment of the beverage.

The opaqueness of the state of the art lid also deprives the consumer of seeing the color and level of the coffee in the cup. Sight in and of itself does not stimulate a pleasure response because while drinking, one cannot see the coffee even when drinking from an open cup. To see the coffee just prior to drinking has a positive effect because the drinker sees the movement and color of the coffee in the cup. This effect causes the consumer to anticipate the taste, smell and temperature of the coffee, and to not be distracted by the uncertainty of when and at what flow rate the coffee will reach the spout. The elimination of these sensory obstacles with the addition of elements that facilitate sensory perception allow the consumer enhanced enjoyment of a gourmet cup of coffee.

3. Summary of the Invention

It is an object of the invention disclosed herein to provide a beverage cup lid comprising a combination of elements to simultaneously enhance the sensory responses of taste, smell, touch and sight during drinking with the beverage cup lid in place. The sensory elements comprise openings, transparent materials, shape and media through which liquid and vapor can pass, and through which heat can conduct or convect. The media comprise: perforations, screens, membranes, fabrics, baffles or any systematic or random presence or arrangement of materials or lack thereof that passively blocks, impedes or controls the flow of liquid or vapor.

It is another object of this invention to provide a beverage cup lid comprising a physical element that allows the addition and stirring of condiments while the lid is fully installed on the cup. The physical element comprises a transparent hatch section of the lid that is hinged, by impressing or stamping the lid material, allowing the hatch to open by manipulation with a common stirring stick causing physical access to the contents for the addition and stirring of condiments. Then upon completion and removal of the stirring stick, the hinged hatch plastically recovers to its closed position.

The invention disclosed herein integrates the following elements of a press and lock on beverage cup lid: a spout, of a shape and location on the lid, for effective contact between the discharging liquid and the inside of the upper lip; a taste and temperature sensing enhancing means allowing capillary attraction of liquid through an area of the lid opposite the spout where the lid comes into contact with the upper surface of the front of the tongue; olfactory enhancing means allowing passage of vapors through an area of the lid in the proximity of where the nostrils would be during drinking; a rim, of a shape, height and curvature that replicates the rim of a normal cup, surrounding a transparent section of the lid acting as a window for visual access to the cup's contents; and a hatch which is a hinged moveable portion of the transparent section of the lid for physical access to the cup's contents. Each of these elements is described in greater detail as follows:

Spout: the spout can be an opening cut into the lid material to allow a beverage discharge flow rate, for drinking, equivalent to that of a cup without a lid. The shape of the spout allows early contact between the forward surface of the upper lip, pouring of the contents into the mouth and draining back into the cup to prevent pooling of the contents in the top of the lid.

Taste and Temperature Sensing Enhancing Means: located in the tipped forward nearly upright drinking position of the lid and cup, where the tongue contacts the lid behind the spout, to facilitate controlled passage of a liquid. The taste and temperature sensing enhancing means is contained within a circular area or could be of any logical shape such as the upper surface of the front of the tongue. This element's properties, in relation to the surface tension of the contained beverage, blocks or impedes flow or seepage of the beverage until contact between it and the tongue as the cup and lid are tipped backward. The contact causes capillary action on the liquid that, then passes in minute amounts, through the taste and temperature sensing enhancing means and then on to the taste buds, and temperature sensing nerve endings on the upper surface of the front of the tongue.

Olfactory Enhancing Means: located around the forward half of the inside surface of the rim of the lid and usually comprising a band of perforations. These olfactory enhancing means can, be any other logical shape, location or size that effectively allow the passage of vapor, and are usually located around the position of the drinker's nostrils in the drinking mode of the cup and lid. The properties of the olfactory enhancing means in relation to the surface tension and vaporization of the contained beverage, allow beverage vapors to pass through it but impede or blocks leakage of liquid beverage.

Window: the inner circular area of the lid is a transparent window allowing visibility to the contents of the cup. This inner circular area is sloped downward from its diameter, where a hinge is impressed or stamped into the material. The sloped semicircular shaped sections of this area form a pitch for back drainage of any liquid that leaks above the lid. The semicircular section closest to the spout is fixed to the bottom of the rim of the lid along its inner circumference and it is this area that is stationary.

Hatch: is the other half of the transparent inner circular area. The hatch, remains attached along the diameter that is impressed or stamped to act as a plastic hinge. This half when pushed downward, with a common stirring stick, while the cup and lid are in the standing upright position opens this semicircular section of the lid. Manipulation of the stirring stick holds the movable half-downward to allow addition and stirring of condiments into the beverage without removal of the lid. Removal of the stirring stick allows the movable half of the circular section to return to the closed position.

DESCRIPTION OF THE PREFERRED EMBODIMENT

Figure 1:
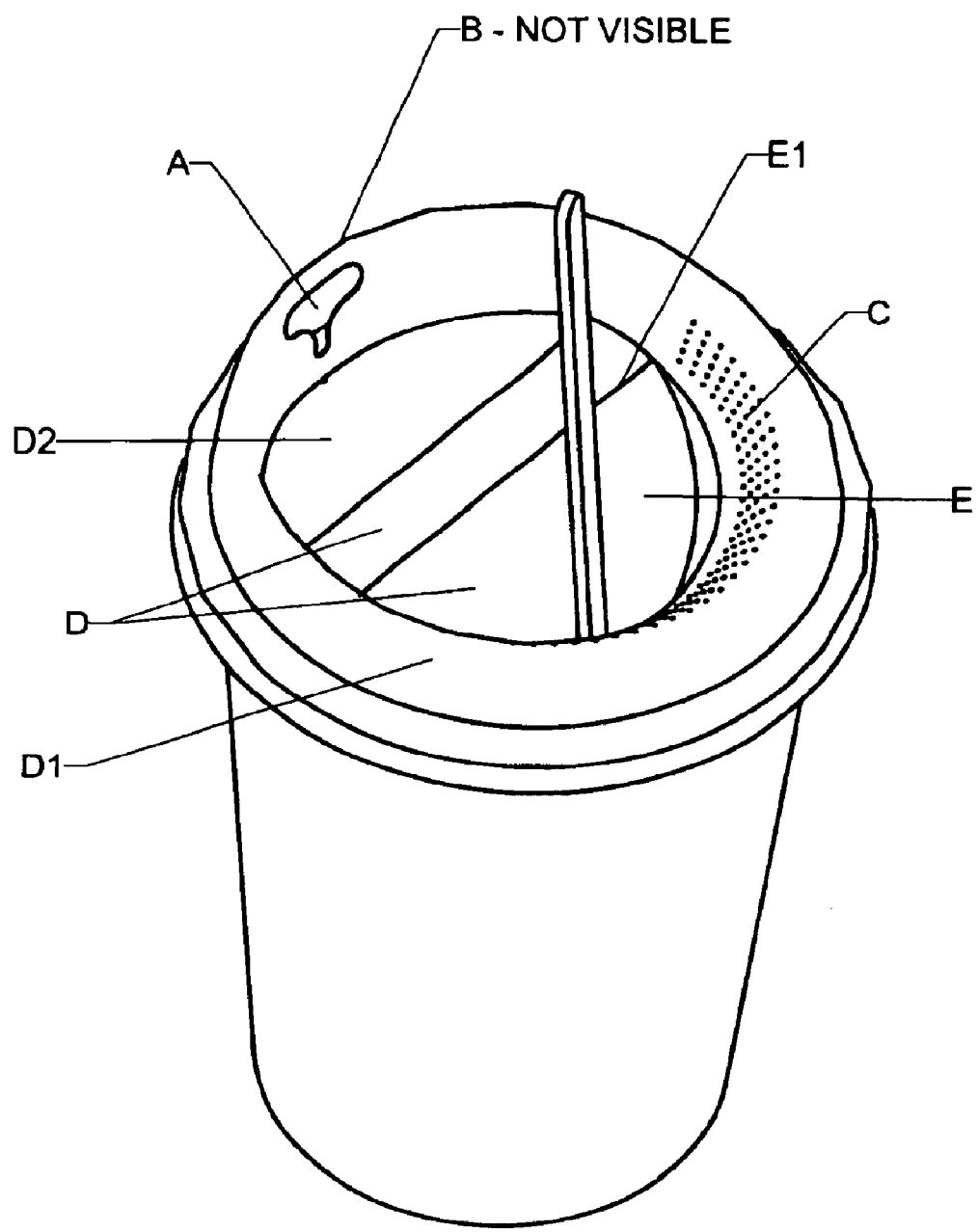
FIG. 1. is a perspective of the invention placed on a common cup. The Spout (A) is largest at the top and is oriented predominantly vertically simulating the normal location from which liquid would flow from a standard uncovered cup. The Spout size decreases to almost a point allowing early contact between the forward surface of the upper lip and the beverage, and allows remnant beverage to drain back into the cup. The Taste and Temperature Sensing Enhancing Means (B) utilizes perforations, in this perspective, as the AMedium@ through which liquid passes at the moment of contact between tongue and the Taste and Temperature Sensing Enhancing Means thereby enhancing the senses of taste and touch, i.e., the sensing of temperature. The "medium" could be of other material or geometric arrangement of openings in the lid surface. Some of the other "media" could comprise: fine screen, fabric, fine slits or permeable membrane. The Olfactory Enhancing Means (C) utilize perforations, in this perspective, as the "medium" through which vapors pass and remain in the proximity of the nostrils during drinking thereby enhancing the sensation of smell. The AMedium@ could be of other material or geometric arrangement of openings in the lid surface. Some of the other "media" could be: fine screen, fabric, fine slits or permeable membrane. The Window (D), shown in this perspective, is made of transparent plastic. The outer portion of the lid or rim (D1, is opaque but can also be translucent or transparent. The Window is divided into two areas (D2), connected to (D1), and (E), not connected to (D1) but connected diametrically to (D2) by hinge (E1). The hinge is impressed or stamped into the plastic Window allowing the Hatch (E), movable section of the Window, to rotate downward about the diametrical hinge (E1). The Window and its hinge are plastically formed such that in its undisturbed condition, Hatch (E) is closed. A common stirring stick manipulated by a person opens and holds open Batch (E) allowing the addition and stirring of condiments into the beverage without removal of the lid.
Figure 2:
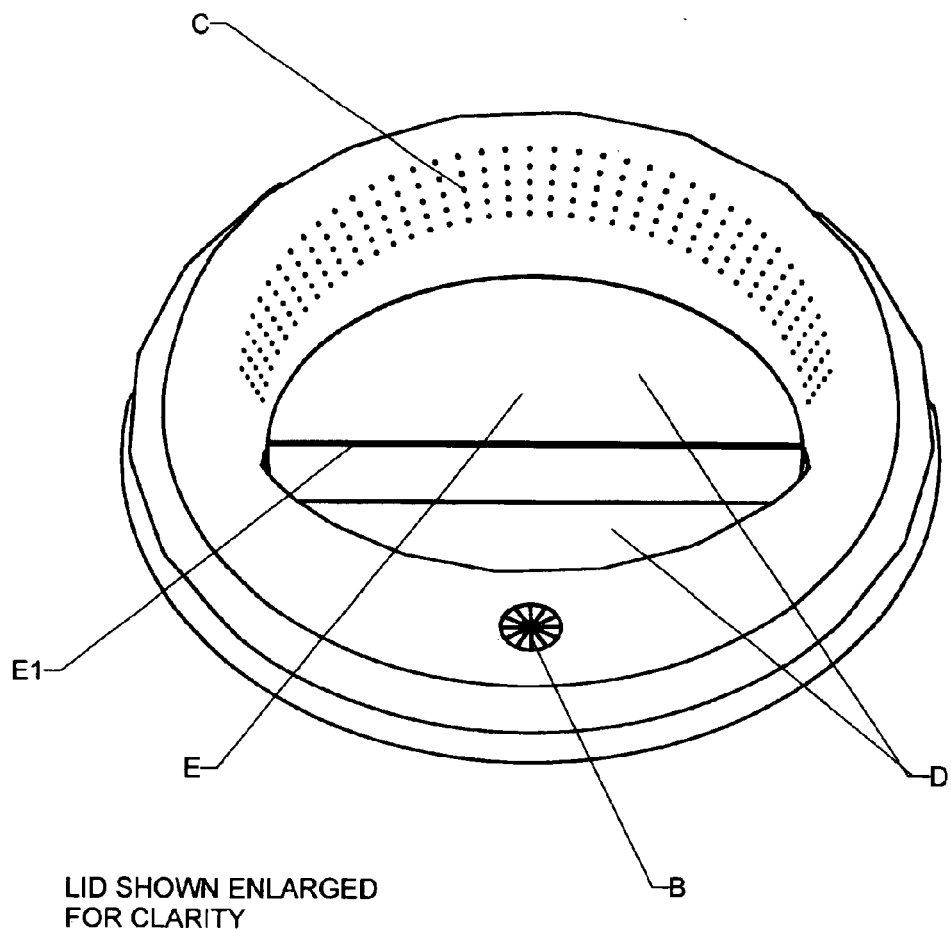
FIG. 2. is a top perspective of the invention with its Taste and Temperature Sensing Enhancing Means (B), Olfactory Enhancing Means (C), Window (D), Hatch (E), and Hinge (E1).
Figure 3:
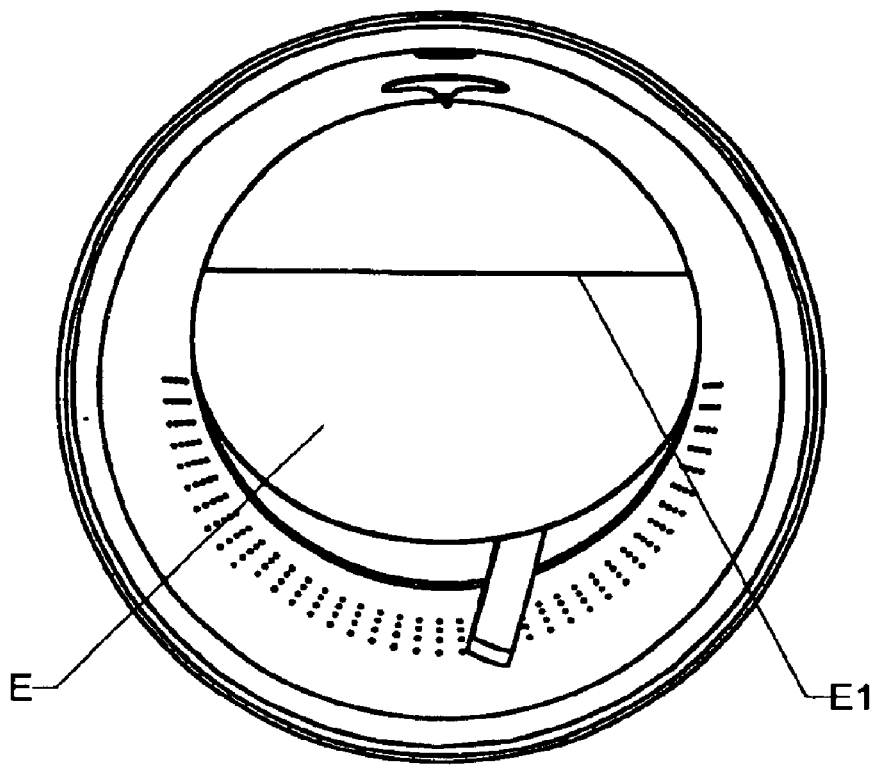
FIG. 3. is a bottom perspective of the invention with a stirring stick in place showing the opening action of the Hatch (E) about its Hinge (E1).
Figure 4:
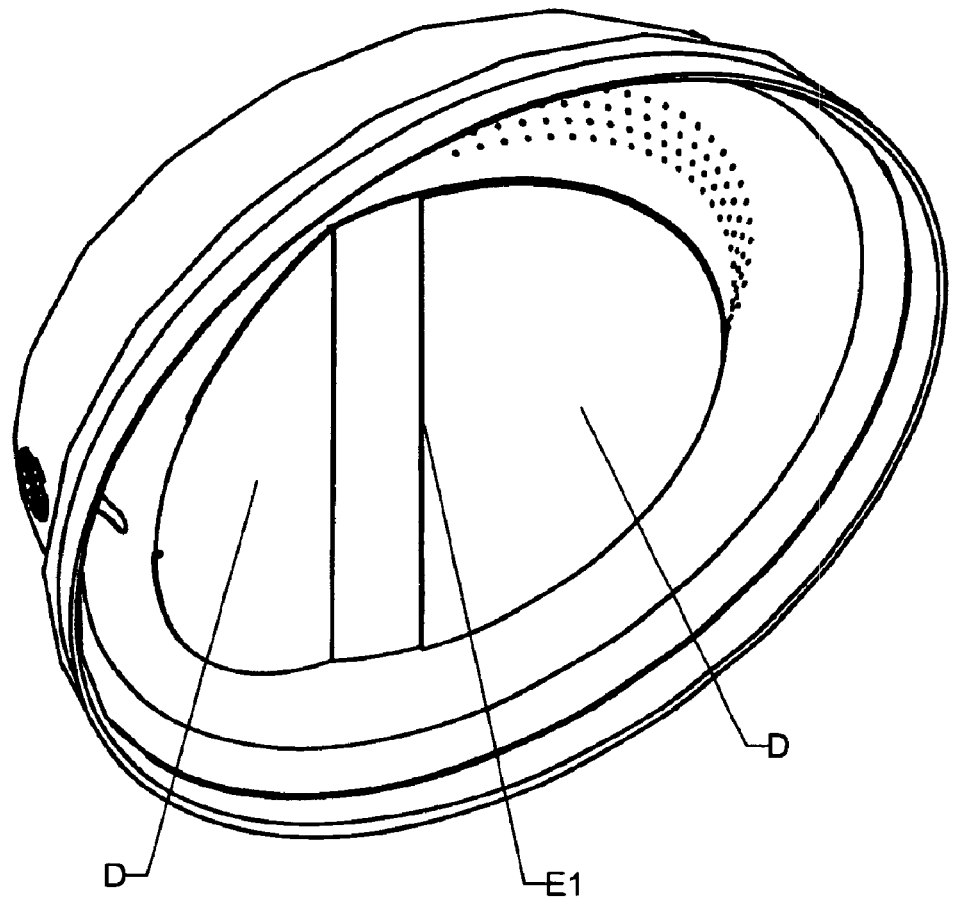
FIG. 4. is a bottom perspective of the invention clearly showing the pitched sections of the Window (D). The peak of the pitch is above the Hinge (E1).

The preferred embodiment of the invention comprises physical elements that allow and enhance a person's multiple sensory experience and that facilitate a person's manipulation of the combined parts of the arrangement, disclosed herein, while drinking a beverage from a disposable or reusable beverage container, equivalent to a cup without a lid. Sensory enhancing and manipulation facilitating elements can be of numerous and varied means shapes and combinations that by the senses of taste, smell, touch and sight can enhance the human experience, manipulation and function of the invention. The physical elements of the invention comprise shapes, materials or the lack thereof, or combinations of both, and transparent materials, and orientation of the elements that allow enhancement of human sensory response and optimal manipulation of the invention. Examples of multiple sensory shapes, and materials or the lack thereof, are depicted in FIGS. 1 and 2 in the form of a thin shell molded, extruded or otherwise fabricated to an ergonomic shape. Material is oriented to optimize the fit between the invention and the human lips, tongue and nose, and to minimize the movement of the human head in performing the simple act of drinking. The lack of material allows optimal flow of a beverage into the mouth and onto the tongue and allows beverage vapors to escape the container thereby allowing the sensory experience of smell. However, these materials or lack thereof can be of any logical form and combination of shape, orientation, absence, presence or type of material. For example, instead of perforations as depicted in two places on the invention, a membrane, fabric, screen or different shape of material penetrations can be oriented as depicted or logically located on any other part of the invention. Examples of transparent-material and its orientation for facilitating manipulation of the invention are depicted in FIGS. 1 through 4 as the inner circular shape of the invention that serves two functions. The transparent material functions as a window to the beverage contents and the forward semicircular half of the window is detached from its circumferential segment and is diametrically formed or stamped to make a hinged hatch. Manual insertion of a stirrer stick through the moveable half of the window opens it which then, by the effect of material plasticity, automatically recovers to its closed position after manual stirrer stick removal. However, the transparent material can be of any logical shape or location on the invention to enhance visibility of the beverage contents. Physical access to the container contents can be through any logical moveable and recoverable shape, form and type of material. An example of an alternative to the depicted means is a two or three-dimensional aperture in the shape of a circle or cone, respectively, that opens outward and downward with the stirrer stick to form a funnel through which condiments can be added and stirred without removal of the lid from the cup. The effect of material plasticity causes the funnel shape to automatically recover to its closed position by removal of the stirrer stick. The entire circular transparent window can be a shallow inverted cone shape with the conical aperture of a smaller radius that opens and closes with the insertion and removal, respectively, of a stirrer stick, the combination of window and aperture being of a shape that allows a comfortable fit with the nose and mouth for drinking.

What is claimed is:

1. A lid for a drinking cup, the lid comprising:
  a) a rounded top wall having a generally circular periphery;
  b) an annular outward side wall depending from said rounded top wall outwardly about its periphery;
  c) an annular mounting portion at the bottom of said annular outward side wall for sealingly engaging the lip of the drinking cup;
  d) an annular inward side wall depending from said rounded top wall inwardly about its periphery;
  e) a recessed circular surface engaged to a portion of the bottom of said annular inward side wall, said recessed circular surface comprising a hinge across its center and a non-engaged hatch, said hatch being slightly slanted downwardly allowing back drainage of any portion of the cup's contents that could otherwise accumulate on the recessed circular surface, said hatch sitting against the bottom of the annular inward side wall and being able to open inwardly along the hinge upon external pressure allowing the introduction of a beverage stirring device, additional liquid or condiments into the cup without removal of the lid and so that upon removal of the external pressure, the hatch plastically recovers to its closed position;
  f. a drinking opening spout located on the annular inward side wall and extending downwardly and narrowly along said annular inward side wall to enable drinking from the cup without removal of the lid, said spout sized to allow the beverage to discharge at a flow rate equivalent to that of a drinking cup without a lid, said spout shaped to enhance contact between the discharging liquid and the inside of the user's upper lip and to further allow non-consumed liquid to drain back into the cup thus preventing pooling of the liquid on the recessed circular surface;

g. a circular medium area located on the annular outward side wall directly across the spout, said circular medium area being permeable so as to facilitate the controlled passage of a discharging liquid, said circular medium area's comprising a system selected from the group consisting of a permeable membrane, a permeable fabric, a permeable screen, a plurality of fine baffles, a plurality of fine circular perforations and a plurality of fine slits; and h. an olfactory enhancing means located on the annular inward side wall opposite the spout to enable olfactory perception of the liquid in the cup without removal of the lid.

2. A lid for a drinking cup according to claim 1 wherein the recessed circular surface is made out of transparent material so that the user can see the appearance and level of the beverage in the cup.

3. A lid for a drinking cup according to claim 1 wherein the hatch is made out of transparent material so that the user can partially see the appearance and level of the beverage in the cup.

4. A lid for a drinking cup according to claim 1 wherein the recessed circular surface's hinge is achieved by impressing or stamping the recessed circular surface.

5. A lid for a drinking cup according to claim 1 wherein the olfactory enhancing means comprises a band or ribbon shaped system selected from the group consisting of a plurality of small perforations, a permeable membrane, a permeable screen, a permeable piece of fabric, and a plurality of fine slits.

* * * * *